US012603755B2

(12) United States Patent
Kashani et al.

(10) Patent No.: US 12,603,755 B2
(45) Date of Patent: Apr. 14, 2026

(54) REMOTE ATTESTATION WITH REMEDIATION

(71) Applicant: Denso Corporation, Kariya (JP)

(72) Inventors: Ameer Kashani, Southfield, MI (US); Carlos Mora-Golding, Southfield, MI (US); Yasuharu Sugano, Kariya (JP); Tomonori Ikuse, Kariya (JP); Madoka Asai, Kariya (JP)

(73) Assignee: DENSO CORPORATION, Kariya (JP)

( * ) Notice: Subject to any disclaimer, the term of this patent is extended or adjusted under 35 U.S.C. 154(b) by 86 days.

(21) Appl. No.: 18/624,575

(22) Filed: Apr. 2, 2024

(65) Prior Publication Data

US 2025/0106001 A1 Mar. 27, 2025

Related U.S. Application Data

(60) Provisional application No. 63/584,187, filed on Sep. 21, 2023.

(51) Int. Cl.
*H04L 29/06* (2006.01)
*H04L 9/00* (2022.01)
*H04L 9/32* (2006.01)

(52) U.S. Cl.
CPC ............ *H04L 9/008* (2013.01); *H04L 9/3236* (2013.01)

(58) Field of Classification Search
CPC ....... H04L 9/008; H04L 9/3236; H04L 63/12; H04L 63/123; G06F 21/12; G06F 21/55; G06F 21/56; G06F 21/57
See application file for complete search history.

(56) References Cited

U.S. PATENT DOCUMENTS

| | | | |
|---|---|---|---|
| 10,726,000 B1 * | 7/2020 | Fortney ................ | H04L 9/3239 |
| 11,650,800 B2 | 5/2023 | Scarlata et al. | |
| 12,107,869 B1 * | 10/2024 | Kannan .................. | H04L 63/20 |
| 2022/0060453 A1 * | 2/2022 | Crabtree ................ | H04L 63/08 |

OTHER PUBLICATIONS

Wang, et al., "ARI: Attestation of Real-time Mission Execution Integrity", Proceedings of the 32nd Usenix Security Symposium, Aug. 9-11, 2023, 19 pages.
Sun, et al., "OAT: Attesting Operation Integrity of Embedded Devices", arXiv:1802.03462v3, Oct. 1, 2019, 17 pages.
Qin, et al., "RIPTE: Runtime Integrity Protection Based on Trusted Execution for IoT Device", Security and Communication Networks, 2020, 14 pages.

* cited by examiner

*Primary Examiner* — Malcolm Cribbs
(74) *Attorney, Agent, or Firm* — Christopher G. Darrow; Darrow Mustafa PC

(57) ABSTRACT

Systems, methods, and other embodiments described herein relate to remote attestation using a homomorphic hash. In one embodiment, a method includes identifying software components and associated metrics of the software components executing within a computing system of a vehicle according to a policy. The method includes constructing a tree according to the software components and partitions within the software components. The method includes storing, in leaf nodes of the tree, measurements of the metrics. The parent nodes define a hierarchical relationship between software components and the partitions. The method includes generating an incremental hash of the tree. The method includes providing the incremental hash as a secure representation of the software components.

20 Claims, 10 Drawing Sheets

240

400

| Item | Hash | Process | Priority | Refresh Rate | Addresses |
|---|---|---|---|---|---|
| libssl.so | hash_value1 | hash(EVP_PKEY@.data) == hash(EVP_PKEY@local) | 1 | 10 | P1 = .text:4kB |
| libcrypto.so | hash_value2 | hash(Pn) == (hash_valuesN) hash(struct_Key@.stack) == hash(struct_Key@local) | 1 | 10 | P1 = .text:4kB, P2 = .data:16kB, P3 = ... |
| libc.so | hash_value3 | hash(§jump_table@.stack) == hash_value5 | 0 | 10 | ... |
| HMI_app.exe | hash_value6 | Literal(.data+0xFF) == 0x01 | 2 | 100 | ... |
| media_app.exe | hash_value7 | hash(§USB_device_allowed@.heap) == hash_value8 | 3 | 500 | ... |

FIG. 4

500
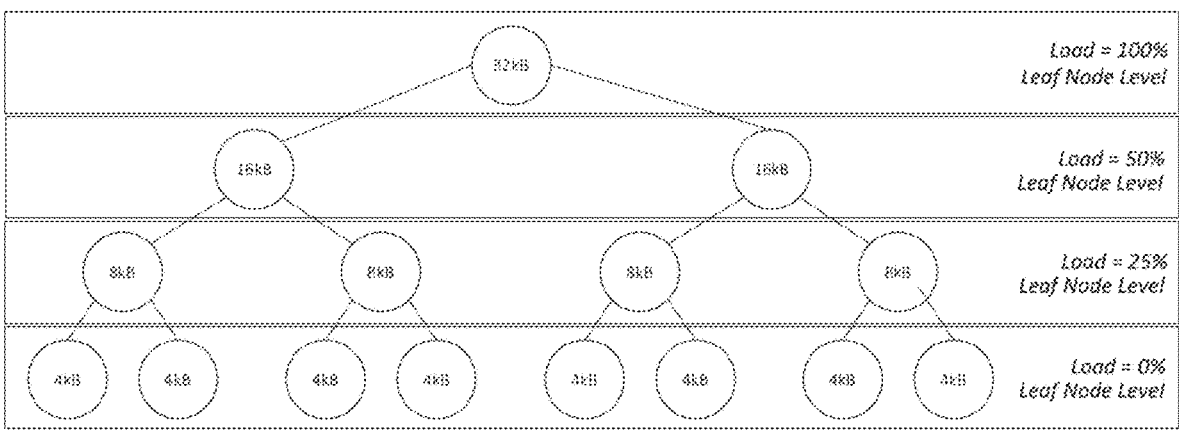
FIG. 5

700

800

900

Start

910
Acquire Information About
A Vehicle

920
Identify Vulnerable Vehicles Using
Mitigation Model

930
Distribute Pre-emptive Mitigation To
The Vulnerable Vehicles

End

REMOTE ATTESTATION WITH REMEDIATION

CROSS-REFERENCE TO RELATED APPLICATIONS

This application claims benefit of U.S. Provisional Application No. 63/584,187, filed on, Sep. 21, 2023, which is herein incorporated by reference in its entirety.

TECHNICAL FIELD

The subject matter described herein relates in general to systems and methods for remote attestation and, more particularly, to using a homomorphic hash to facilitate remote attestation of software that is incrementally updated.

BACKGROUND

Traditionally, vehicle security has involved a vehicle owner using a physical key to lock a door and/or start a vehicle manually. As technology advances, vehicle systems have morphed into more complex systems that involve additional features but also encounter additional/different risks. For example, many vehicles now include electronic systems that have the ability to collect data about the operation of the vehicle, communicate with remote systems, receive/provide electronic controls, and so on. However, along with enriched features and connectivity to outside networks comes the potential for attacks by malicious actors on computing systems in the vehicle that provide for these advanced features. For example, malicious actors may attempt to gain access to vehicle systems in order to alter the operation of the vehicle, steal sensitive information, and so on.

In particular, various computing systems within the vehicle can include a myriad of programs that function together in order to provide for the noted functionality. To secure these programs, the system may validate the programs at load time by, for example, checking the programs using a cryptographic hash to ensure the programs have not been modified. However, performing measurements during runtime after loading can be complex and result in race conditions that allow for time of check time of use (TOC-TOU) attacks. Additionally, when measurements indicate a failure, the hash can complicate identifying impacted components since it is over the entire software package as a whole. Accordingly, securing software packages and tracking security issues is difficult within a system that is comprised of software including many components and updates.

SUMMARY

Example systems and methods associated with remote attestation using a homomorphic hash are disclosed. As previously noted, malicious attacks on the computing system of a vehicle can cause significant difficulties. While some attacks may simply expose sensitive information, other attacks may cause problems with the functioning of different vehicle systems. Moreover, because vehicle systems are generally validated at startup and not during runtime, these systems can be vulnerable to intervening runtime attacks.

Therefore, in one approach, an inventive system functions to secure a computing system within a vehicle by using an incremental hash (i.e., also referred to as homomorphic hash herein). For example, the inventive system identifies and prioritizes different software components and portions thereof within the computing system according to a policy. The policy is defined according to an analysis of the computing system of the vehicle using, for example, fault tree analysis or another technique to identify critical/vulnerable elements, such as which software components involve safety-critical aspects of the vehicle. The policy may further define how to partition the software components and the metrics that are to be measured.

In any case, the inventive system constructs a tree, such as a Merkle tree, to define relationships between elements. The tree includes measurements of the metrics in the child leaf nodes with separate parent nodes being associated with separate partitions of the software components. The system hashes the leaf nodes and combines the hashes from the leaf nodes to form the parent nodes according to the incremental hash. The system iterates over the tree in this way until combining all of the hashes into a root hash for the root node, which is used to then secure and verify the integrity of the software components in the system.

As the computing system of the vehicle operates, the values of the metrics may change. Thus, the policy defines a frequency with which the metrics are measured. When a value of a metric changes, the system updates the associated leaf nodes and can recompute the hash for the direct parent nodes. Because of the way in which the incremental hash functions, the system need not update all of the nodes in the tree but simply updates the root hash with the changed hash, thereby simplifying the update process and providing for easy monitoring of changes during runtime to facilitate detecting runtime attacks.

In any case, the inventive system, in at least one arrangement, uses the root hash to perform attestation with relying parties, such as another vehicle, a remote system, and so on. That is, the vehicle can receive an attestation request from a remote device so that the remote device can verify the integrity of the computing system on the vehicle. In response, the vehicle can provide the current root hash. The remote device has access to a reference hash for the vehicle and can compare the current root hash with the reference hash to determine whether the vehicle has been attacked and the computing system is experiencing an integrity failure. If an integrity failure exists, then the remote system can quickly trace the failure by requesting hashes from parent nodes down the hierarchy of the tree until identifying a branch and node in which the failure exists. Once identified, the remote device may provide a mitigation deployment to the vehicle to remediate the failure. For example, the remote device may reset the computing system of the vehicle into a failsafe mode, re-image the software components within the memory with a known valid image, deploy an explicit fix (e.g., an executable or file diff that corrects the issue), and so on. In this way, the present approach improves the security of software components within the vehicle by implementing an efficient mechanism for securing the software components that can be easily updated and traced to identify issues.

In one embodiment, a security system is disclosed. The security system includes one or more processors and a memory that is communicably coupled to the one or more processors. The memory stores a control module including instructions that, when executed by the one or more processors, cause the one or more processors to identify software components and associated metrics of the software components executing within a computing system of a vehicle according to a policy. The instructions include instructions to construct a tree according to the software components and partitions within the software components. The instructions include instructions to store, in leaf nodes of the tree, measurements of the metrics. The parent nodes define a hierarchical relationship between software components and the partitions. The instructions include instructions to generate an incremental hash of the tree. The instructions include instructions to provide the incremental hash as a secure representation of the software components.

In one embodiment, a non-transitory computer-readable medium is disclosed. The computer-readable medium stores instructions that, when executed by one or more processors, cause the one or more processors to perform the disclosed functions. The instructions include instructions to identify software components and associated metrics of the software components executing within a computing system of a vehicle according to a policy. The instructions include instructions to construct a tree according to the software components and partitions within the software components. The instructions include instructions to store, in leaf nodes of the tree, measurements of the metrics. The parent nodes define a hierarchical relationship between software components and the partitions. The instructions include instructions to generate an incremental hash of the tree. The instructions include instructions to provide the incremental hash as a secure representation of the software components.

In one embodiment, a method is disclosed. In one embodiment, the method includes identifying software components and associated metrics of the software components executing within a computing system of a vehicle according to a policy. The method includes constructing a tree according to the software components and partitions within the software components. The method includes storing, in leaf nodes of the tree, measurements of the metrics. The parent nodes define a hierarchical relationship between software components and the partitions. The method includes generating an incremental hash of the tree. The method includes providing the incremental hash as a secure representation of the software components.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

FIG. 4 illustrates a table of example metrics and associated attributes.

FIG. 5 illustrates a diagram of block sizes for nodes in the tree.

DETAILED DESCRIPTION

Figure 1:
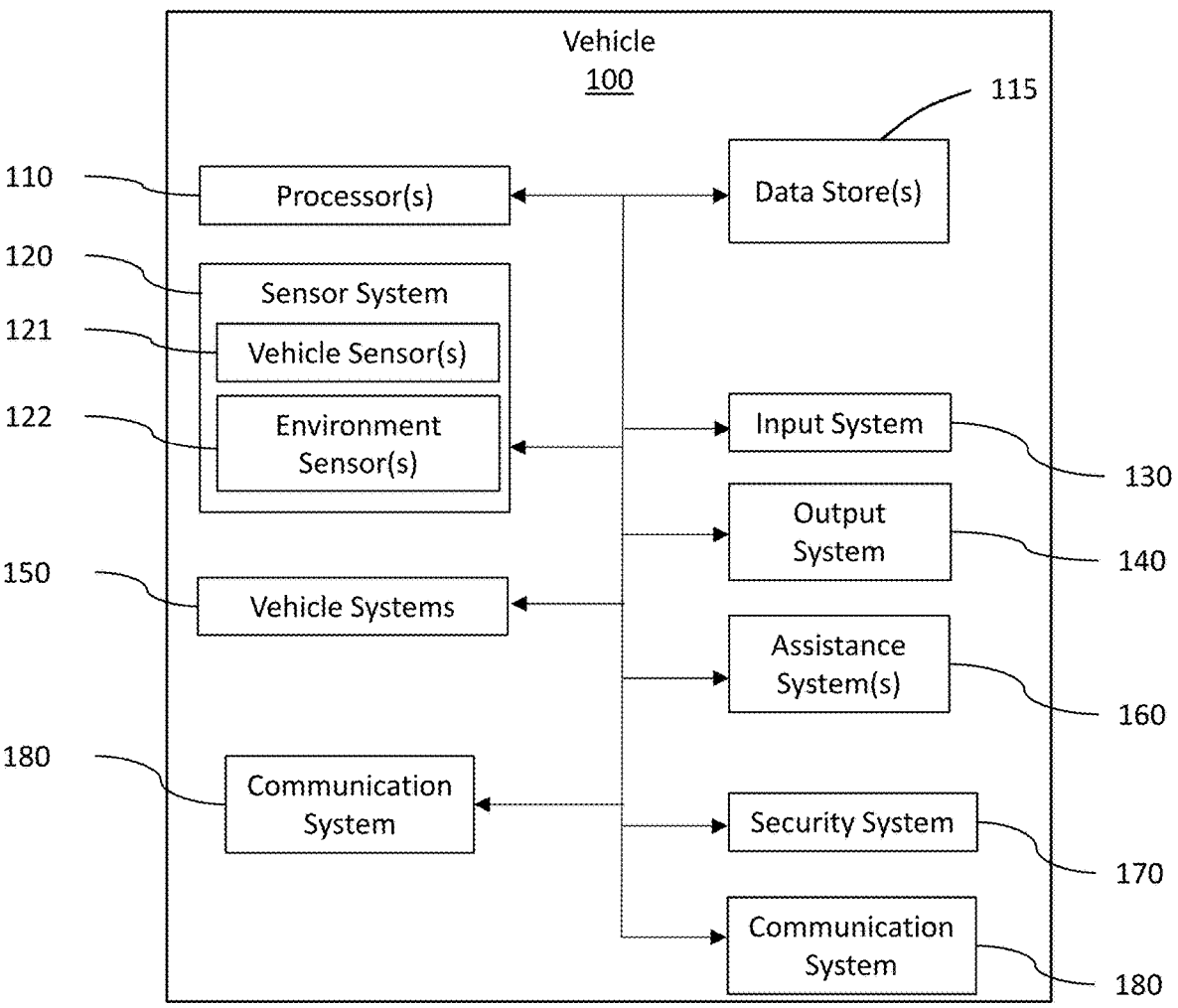
FIG. 1 illustrates one embodiment of a configuration of a vehicle in which example systems and methods may be implemented.

Systems, methods, and other embodiments associated with remote attestation using a homomorphic hash are disclosed. As previously noted, malicious attacks on the computing system of a vehicle can cause significant difficulties. While some attacks may simply expose sensitive information, other attacks may cause problems with the functioning of different vehicle systems. Moreover, because vehicle systems are generally validated at startup and not during runtime, these systems can be vulnerable to intervening runtime attacks.

Therefore, in one approach, an inventive system functions to secure a computing system within a vehicle by using an incremental hash (i.e., also referred to as homomorphic hash herein). For example, the inventive system identifies and prioritizes different software components and portions thereof within the computing system according to a policy. The policy is defined according to an analysis of the computing system of the vehicle using, for example, fault tree analysis or another technique to identify critical/vulnerable elements, such as which software components involve safety-critical aspects of the vehicle. The policy may further define how to partition the software components and the metrics that are to be measured.

In any case, the inventive system constructs a tree, such as a Merkle tree, to define relationships between elements. The tree includes measurements of the metrics in the child leaf nodes with separate parent nodes being associated with separate partitions of the software components. The system hashes the leaf nodes and combines the hashes from the leaf nodes to form the parent nodes according to the incremental hash. The system iterates over the tree in this way until combining all of the hashes into a root hash for the root node, which is used to then secure and verify the integrity of the software components in the system.

As the computing system of the vehicle operates, the values of the metrics may change. Thus, the policy defines a frequency with which the metrics are measured. When a value of a metric changes, the system updates the associated leaf nodes and can recompute the hash for the direct parent nodes. Because of the way in which the incremental hash functions, the system need not update all of the nodes in the tree but simply updates the root hash with the changed hash, thereby simplifying the update process and providing for easy monitoring of changes during runtime to facilitate avoiding runtime attacks.

In any case, the inventive system, in at least one arrangement, uses the root hash to perform attestation with relying parties, such as another vehicle, a remote system, and so on. That is, the vehicle can receive an attestation request from a remote device so that the remote device can verify the integrity of the computing system on the vehicle. In response, the vehicle can provide the current root hash. The remote device has access to a reference hash for the vehicle and can compare the current root hash with the reference hash to determine whether the vehicle has been attacked and the computing system is experiencing an integrity failure. If an integrity failure exists, then the remote system can quickly trace the failure by requesting hashes from parent nodes down the hierarchy of the tree until identifying a branch and node in which the failure exists. Once identified, the remote device may provide a mitigation deployment to the vehicle to remediate the failure. For example, the remote device may reset the computing system of the vehicle into a failsafe mode, re-image the software components within the memory with a known valid image, deploy an explicit fix (e.g., an executable or file diff that corrects the issue), and so on. In this way, the present approach improves the security of software components within the vehicle by implementing an efficient mechanism for securing the software components that can be easily updated and traced to identify issues.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may instead be an electronic device associated with transportation infrastructure (e.g., roadside unit), a cloud-based system communicating with mobile devices, or other devices that may implement electronic systems that are potentially vulnerable to malicious attack, and thus benefit from the functionality discussed herein.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may, at least in part, be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-10 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a security system 170 that functions to improve the security of the vehicle 100 by implementing the incremental hash to better secure software components during runtime. Moreover, while depicted as a standalone component, in one or more embodiments, the security system 170 is integrated with another system of the vehicle 100 to facilitate improving the security of functions of the systems/modules associated with automated and other controls of the vehicle 100. The noted functions and methods will become more apparent with a further discussion of the figures.

Figure 2:
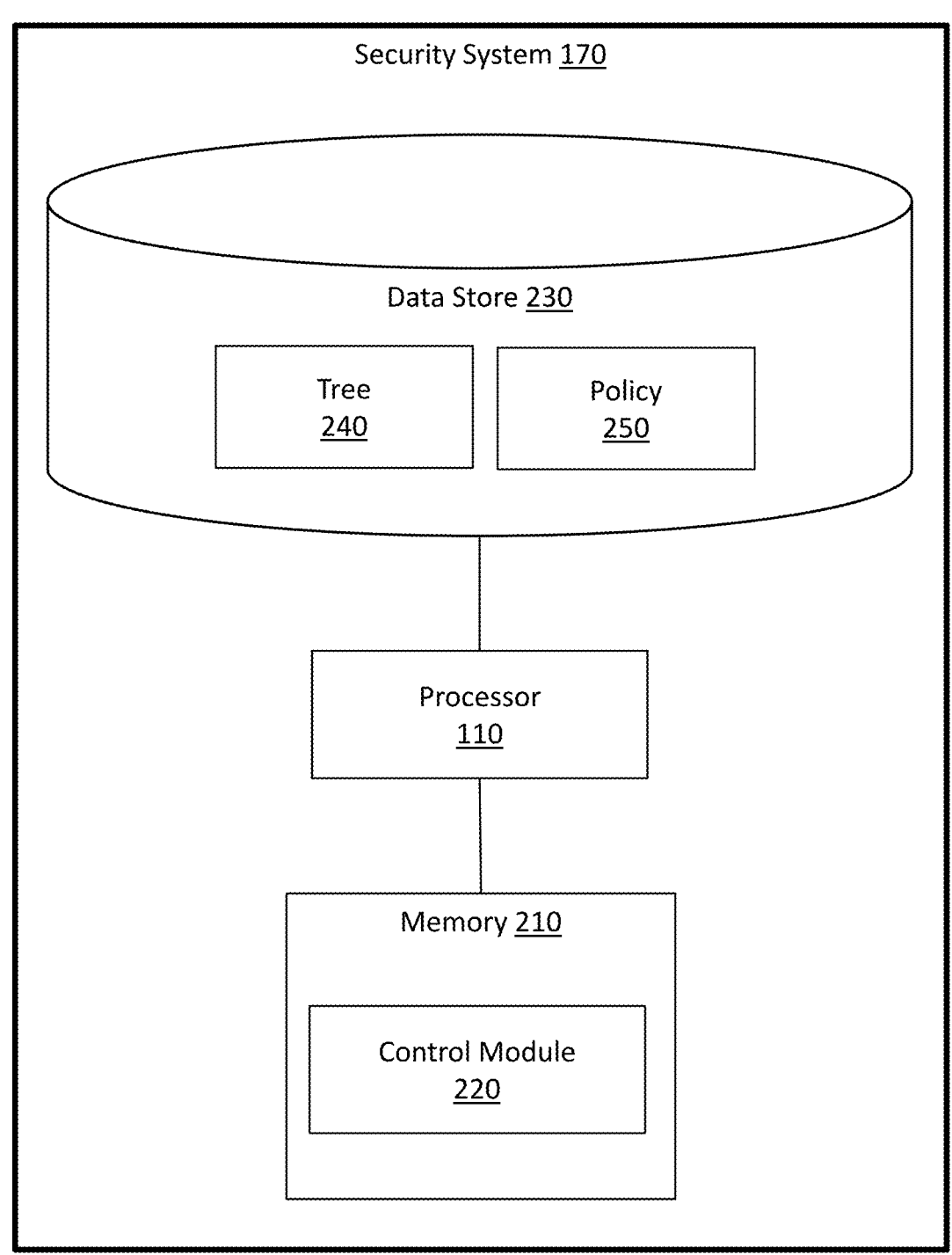
FIG. 2 illustrates one embodiment of a security system that is associated with using incremental hashes to support remote attestation during runtime.

With reference to FIG. 2, one embodiment of the security system 170 is further illustrated. As shown, the security system 170 includes a processor 110. Accordingly, the processor 110 may be a part of the security system 170, or the security system 170 may access the processor 110 through a data bus or another communication pathway. In one or more embodiments, the processor 110 is an application-specific integrated circuit that is configured to implement functions associated with a control module 220. More generally, in one or more aspects, the processor 110 is an electronic processor, such as a microprocessor that is capable of performing various functions as described herein when executing encoded functions associated with the security system 170. Moreover, the processor 110 or another electronic processing unit associated with the security system 170 executes various programs (also referred to herein as software components) that are to be secured/protected.

In various embodiments, the particular functionality of a program may vary but can include automated driving functions (e.g., ADAS functions, machine perception, mapping, object detection/identification, path planning, vehicle control routines, and so on), functions associated with control of the vehicle 100, execution of infotainment systems within the vehicle 100, operating systems and associated components, and so on. Thus, various aspects of the program may be related to the functional safety of the vehicle 100, sensitive/personal information, system operation, and so on, which may be targeted by attackers because of the sensitive/critical information associated therewith. Furthermore, it should be appreciated that the program itself can be structured in different ways but is generally formed of multiple segments. The segments include data elements (e.g., variables), and various functions (i.e., blocks of code associated with performing a particular function). Additionally, the programs/software components are comprised of, in at least one arrangement, static data elements and dynamic data elements. The static data elements include aspects such as source files, text files, and so on. By contrast, the dynamic data elements include fields/variables that change as the software executes, such as, for example, a state of a brake actuator, a cryptographic key, and other variables.

Moreover, while the programs are generally described from a functional viewpoint, it should be appreciated that the programs may take different forms. That is, the programs may be firmware, operating systems, applications, and so on. In any case, the vehicle 100 generally loads the programs at startup. That is, as one example, when the vehicle 100 initially starts from a power on signal (e.g., ignition on, push-button start, etc.), the processor 110 executes a series of commands to initialize the programs, thereby loading the programs for execution. The programs and associated variables may be stored in a memory.

In one embodiment, the security system 170 includes a memory 210 that stores the control module 220 and, in various configurations, additional elements (e.g., programs). The memory 210 is a random-access memory (RAM), read-only memory (ROM), a hard disk drive, a flash memory, or other suitable memory for storing the module 220. In any case, the control module 220 is, for example, computer-readable instructions that, when executed by the processor 110, cause the processor 110 to perform the various functions disclosed herein. While, in one or more embodiments, the module 220 is instructions embodied in the memory 210, in further aspects, the module 220 includes hardware, such as processing components (e.g., controllers), circuits, etc. for independently performing one or more of the noted functions. Thus, the control module 220 may be embodied as instructions within the memory 210 or as a standalone component, such as a system-on-a-chip (SoC), ASIC, or another electronic device. Moreover, the control module 220 may be further embodied in separate instances, such as an instance within the vehicle 100 and an instance within a remote device, such as a cloud-based monitoring service or another vehicle. As will be described in further detail subsequently, the remote device may be another entity that interacts with the vehicle 100 and, thus, confirms the integrity of the vehicle 100 prior to the interaction in order to ensure continued safe operation itself. Similarly, the remote device may be a cloud-based resource, such as a security monitoring service of an OEM that functions to maintain the security of vehicles from a manufacturer.

Furthermore, in one embodiment, the security system 170 includes a data store 230. The data store 230 is, in one arrangement, an electronically-based data structure for storing information. For example, in one approach, the data store 230 is a database that is stored in the memory 210 or another suitable electronic storage medium (e.g., RAM, ROM, on-chip cache, etc.), and that is configured with routines that can be executed by the processor 110 for analyzing stored data, providing stored data, organizing stored data, and so on. In any case, in one arrangement, the data store 230 stores data used by the control module 220 in executing various functions. In one embodiment, the data store 230 includes a tree 240, and a policy 250 along with, for example, other information that is used by the control module 220.

Figure 3:
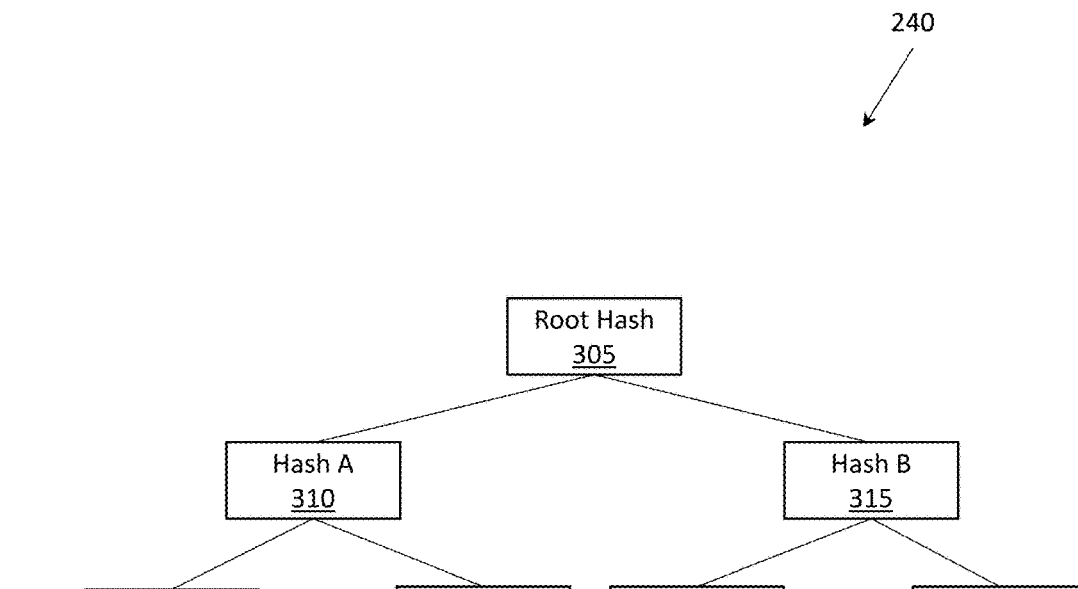
FIG. 3 illustrates one example of a tree as used by the security system of FIG. 2.

As previously described in brief, the tree 240 is, in at least one configuration, a Merkle tree. With reference to FIG. 3, one example of the tree 240 is shown. As illustrated, the tree 240 includes nodes 305-365. It should be noted that portions of the tree 240 in the example of FIG. 3 have been omitted for brevity. Moreover, the tree is not necessarily a binary tree but also may be an unordered tree with varying numbers of child nodes per parent. In any case, the nodes 310-335 are parent nodes and the node 305 is a root node. The nodes 310 and 315 correspond to separate software components A and B. Nodes 320 and 325 correspond to separate partitions of the software component A, while nodes 330 and 335 correspond to separate partitions of the software component B. Child leaf nodes 340, 345, and 350 represent measured metrics of the partition associated with the node 320. Each separate node in the tree 240 also has a hash. The child leaf nodes 340-365 represent direct measurements of aspects of the associated partitions of the respective software component, which each further include hashes of those measurements. That is, the child leaf nodes 340-365 are the only direct hashes of data (either static or dynamic). As a note about FIG. 3 itself, it should be appreciated that not all of the child leaf nodes are illustrated for purposes of brevity.

In any case, in regards to the structure of the 240, the policy 250 defines the structure. The policy 250 is, in one or more arrangements, predetermined according to analysis of the software components within the vehicle 100. The analysis can include fault tree analysis, FMEA, threat analysis and risk assessment, expert code annotations, and so on. In general, this initial analysis, which may be performed by the security system 170 or another system, identifies the separate software components, determines logical partitions therein (e.g., according to different submodules), determines the criticality of partitions, defines partition sizes, determines the timing of when measurements are to be undertaken, which may depend on the criticality, and identifies the particular metrics that are to be measured for hashing in the child leaf nodes. The control module 220 can then implement the policy 250 in order to implement the tree 240 and perform the incremental hashing. The metrics defined by the policy 250 can include various static and dynamic data objects within the vehicle 100. For example, consider FIG.

4, which illustrates a table of different metrics that the security system 170 may measure for the child leaf nodes. FIG. 4 shows five separate items that include separate software libraries, cryptographic values, and application executable files. As shown in FIG. 4, the separate metrics include different priority levels that directly correspond to the timing with which the metrics are refreshed (i.e., how often the system 170 re-measures the metrics). It should be appreciated that the illustrated metrics are provided as examples, and the system 170 can implement a greater number of metrics than shown. Moreover, the dynamic data elements may be located in various storage locations, such as a stack, a heap, a data segment, an anonymous page, and so on. Additionally, although executable files are shown, the security system 170 may also measure non-executable files, including JSON files, CSV files, PNG files, and so on.

Turning to the functioning of the control module 220, in general, the control module 220 includes instructions that function to control the processor 110 to generate an incremental hash. The incremental hash is, in one or more arrangements, a homomorphic hash, such as LtHash, MuHash, AdHash, and so on. In general, the control module 220 creates the root hash (also referred to herein as the incremental hash) of the tree 240 by summing the hashes of all of the child nodes. By way of example, the control module 220 initially functions to measure the various metrics. After the initial measurement, as will be discussed further subsequently, the metrics are re-measured according to the policy 250 in order to secure the vehicle 100 during runtime. In any case, the measurements are stored at the child leaf nodes, and the control module 220 hashes these values to form hashes for the child leaf nodes using one of the noted homomorphic hash algorithms.

The control module 220 then iterates the hashing process over the tree 240 until combining all of the hashes at the root node to form the root hash. For example, with renewed reference to FIG. 3, the control module 220 generates hashes of metrics stored in child leaf nodes 340-350. To form the hash A1 at the parent node 320, the control module 220 sums the hash 0, hash 1, and hash 2 from the child leaf nodes 340-350. The control module 220 similarly hashes other child leaf nodes and sums those hashes to form hashes A2, B1, and B2. In this same way, the control module 220 continues to form hash A at node 310 by combining hashes A1 and A2 and hash B at node 315 by combining hash B1 and B2 from nodes 330 and 335, respectively. Lastly, the root hash of the root node is then formed by combining hash A of node 310 and Hash B of node 315. Accordingly, the control module 220 applies the hash algorithm itself at the child leaf nodes and then simply combines the hashes to form the parent/root node hashes. As such, when a value of a metric changes, updating the overall root node hash is simpler.

Moreover, in regards to block size for separate nodes in the tree 240, the policy 250 may further define the block size. For example, the leaf nodes may have a static block size or a dynamic block size that may be adjusted. In at least one approach, the system 170 may adjust the block size when, for example, the processor 110 is busy. In this case, the control module 220 may consider a higher level of the tree as a subtree. As one example, consider FIG. 5, which shows a tree 500 that is segmented into different levels based on block sizes. As shown, the block size can range from 4 kB to 32 kB where, depending on the current processor load, the control module 220 can adapt the block size and consider a different level of the tree 500 as the leaf node.

When a measurement in one of the leaf nodes changes, the control module 220, in at least one arrangement, can then update the root hash of the root node without recomputing all of the hashes within the tree. For example, with reference again to FIG. 3, if a value of a metric for the node 345 changes, then the control module 220 recomputes the hash 1 value. From this, the control module 220 can update the root hash by simply propagating the changed sum. In addition to updating the incremental hash of the root node, the control module 220 may generate a change/attestation report that includes the changes (i.e., values of the changed metrics) along with the updated incremental hash for the root node. The security system 170 may cryptographically sign the report according to a shared secret key or using public key infrastructure (PKI) to verify the source. In any case, the security system 170 can communicate the report to the cloud-based monitoring service or another entity so that future interactions with the vehicle 100 can be verified.

Additional aspects of the security system 170 and attestation requests will be described in relation to subsequent figures. In any case, it should be appreciated that the security system 170 maintains the tree 240 in order to verify and attest to the integrity of the software executing on the vehicle 100. In this way, the security system 170 is able to confirm the software is valid and has not been corrupted and, therefore, facilitates interactions with remote devices (i.e., relying parties) by confirming the software is not comprised and thus will not comprise the remote devices when interacting therewith.

Figure 6:
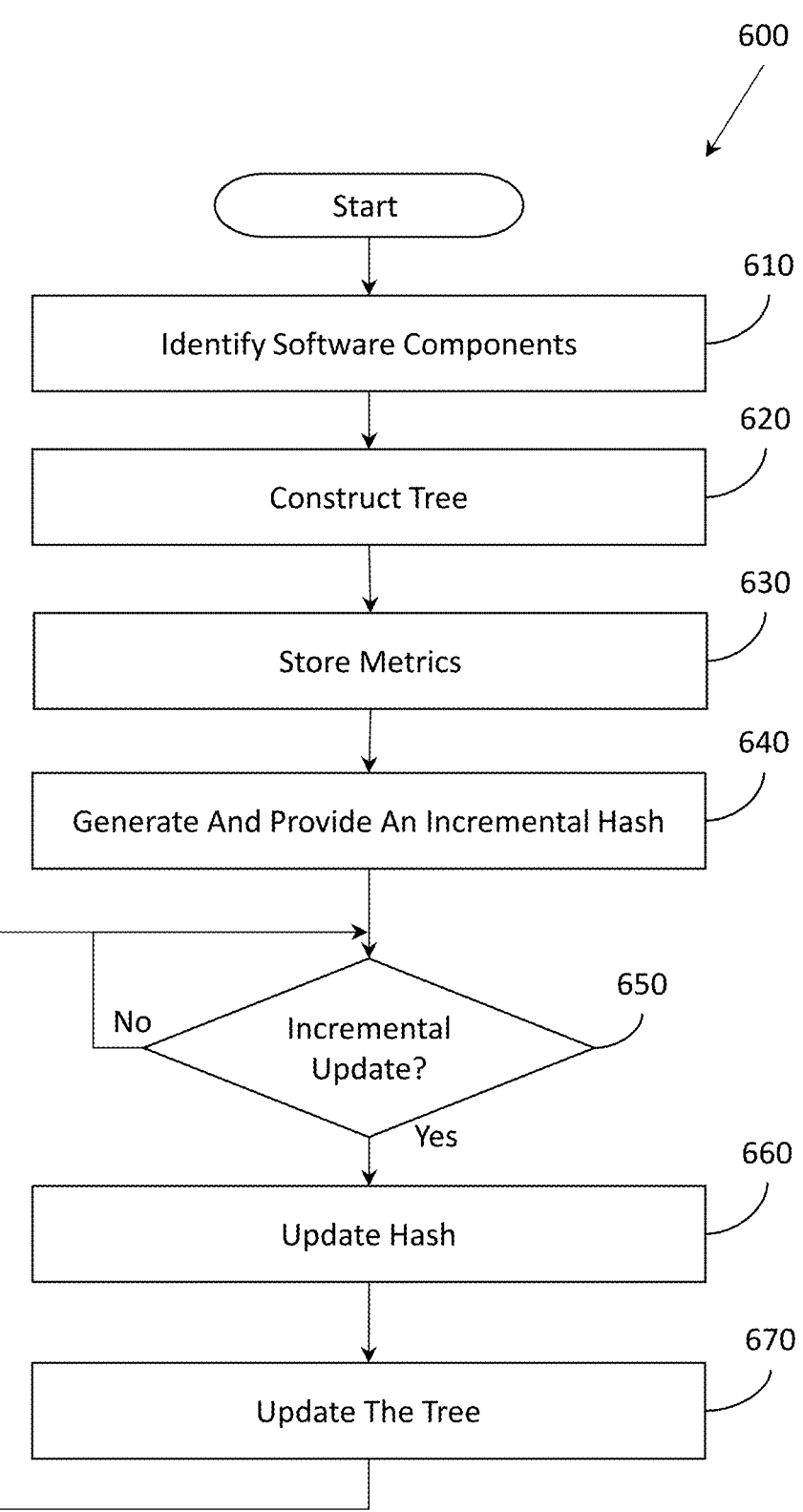
FIG. 6 is a flowchart showing one embodiment of a method for generating and updating incremental hash values.

Additional aspects of securing electronic systems of a vehicle against malicious attacks using incremental hashes will be discussed in relation to FIG. 6. FIG. 6 illustrates a method 600 associated with generating and updating an incremental hash for securing a computing system. Method 600 will be discussed from the perspective of the security system 170 of FIGS. 1 and 2. While method 600 is discussed in combination with the security system 170, it should be appreciated that the method 600 is not limited to being implemented within the security system 170 but is instead one example of a system that may implement the method 600.

At 610, the control module 220 identifies software components and associated metrics of the software components executing within a computing system of the vehicle 100. As previously outlined, the control module 220 determines the software components, the metrics, the partitions, and other aspects of how to monitor the computing system according to the policy 250. The policy 250 is generally predefined according to an analysis of the configuration of the vehicle 100 (e.g., make, model, system architecture, etc.). The system 170 may generate the policy 250 according to various types of software analysis, such as fault tree analysis, and so on. In any case, the security system 170 uses the information from the policy 250 to guide the identification and collection of information about the software components executing within the vehicle 100.

At 620, the control module 220 constructs the tree 240 according to the software components and partitions within the software components. That is, the control module 220 uses the relationships of the partitions with the software components as defined by the policy 250 to define a structure of the tree 240. Thus, as outlined in relation to FIG. 3, the control module 220 defines a hierarchy of the partitions and software components using the tree 240 with the child leaf nodes being associated with the measured metric values of the computing system.

At 630, the control module 220 stores, in the child leaf nodes of the tree 240, measurements of the metrics. Thus, the control module 220 measures memory values, and other aspects of the computing system of the vehicle 100 and stores the values so that the system 170 can subsequently derive the hash values.

At 640, the control module 220 generates the incremental hash of the tree. As previously noted, the control module 220 generates the incremental hash as a homomorphic hash with the hashes within the leaf nodes of the Merkle tree being the direct hashed values of the metrics while the higher levels of the tree represent the combined hashes to form the parent nodes and the root node. Thus, the control module 220 iteratively combines hashes from the parent nodes until reaching a root node and forming a root hash by combining hashes from the lower-level parent nodes in the tree 240. Thus, the root hash/incremental hash is a homomorphic hash where the values that are hashed are the leaf nodes and the intermediate parent nodes of the tree are formed by combining the lower-level hashes and not explicitly rehashing the values together.

Once the control module 220 generates the incremental hash, the control module 220 provides the incremental hash as a secure representation of the software components. That is, the control module 220 may communicate at least the incremental hash to a cloud-based entity that may be a monitoring service from an OEM or other centralized provider in order to register the vehicle 100 as being a trusted entity using the hash. In further embodiments, the control module 220 may provide additional information, such as the tree 240, updates to metrics of the tree 240, and so on, which facilitate subsequent verification of the vehicle 100.

At 650, the control module 220 monitors for changes in the metrics in order to determine when to perform an incremental update. In at least one arrangement, the control module 220 re-measures the metrics at intervals defined by the policy 250. Thus, the control module 220 monitors the metrics by re-measuring the metrics at defined times, which may relate to characteristics of the specific metrics, including a criticality, etc. In general, the control module 220 may compare the current value with a stored value in order to determine whether the value has changed. If no value has changed, then the control module 220 continues monitoring for an incremental update. However, if a value is found to have changed, then the control module 220 proceeds with updating the incremental hash.

At 660, the control module 220 updates the incremental hash. For example, for each separate child leaf node that includes a changed value, the control module 220 recomputes the hash of the node and propagates the changes up the tree 240 but only within branches that are affected by the change. For example, with reference to FIG. 3, if a value of the metric at node 340 changes, then the hash 0 of the node 340 is recomputed. However, the other leaf nodes 345-350 are not recomputed, nor are any hashes of the subtree associated with nodes 325 or 315. Thus, the update is localized to the specific node.

At 670, the control module 220 updates the tree 240 according to the changed hash of the node. As described previously, the control module 220 computes the hash at the parent node using the hashes at the child nodes; thus, in the example of the node 340 changing, the control module 220 then propagates the changes up through parent nodes to the root node to update the tree 240 and the incremental hash of the root node.

Figure 7:
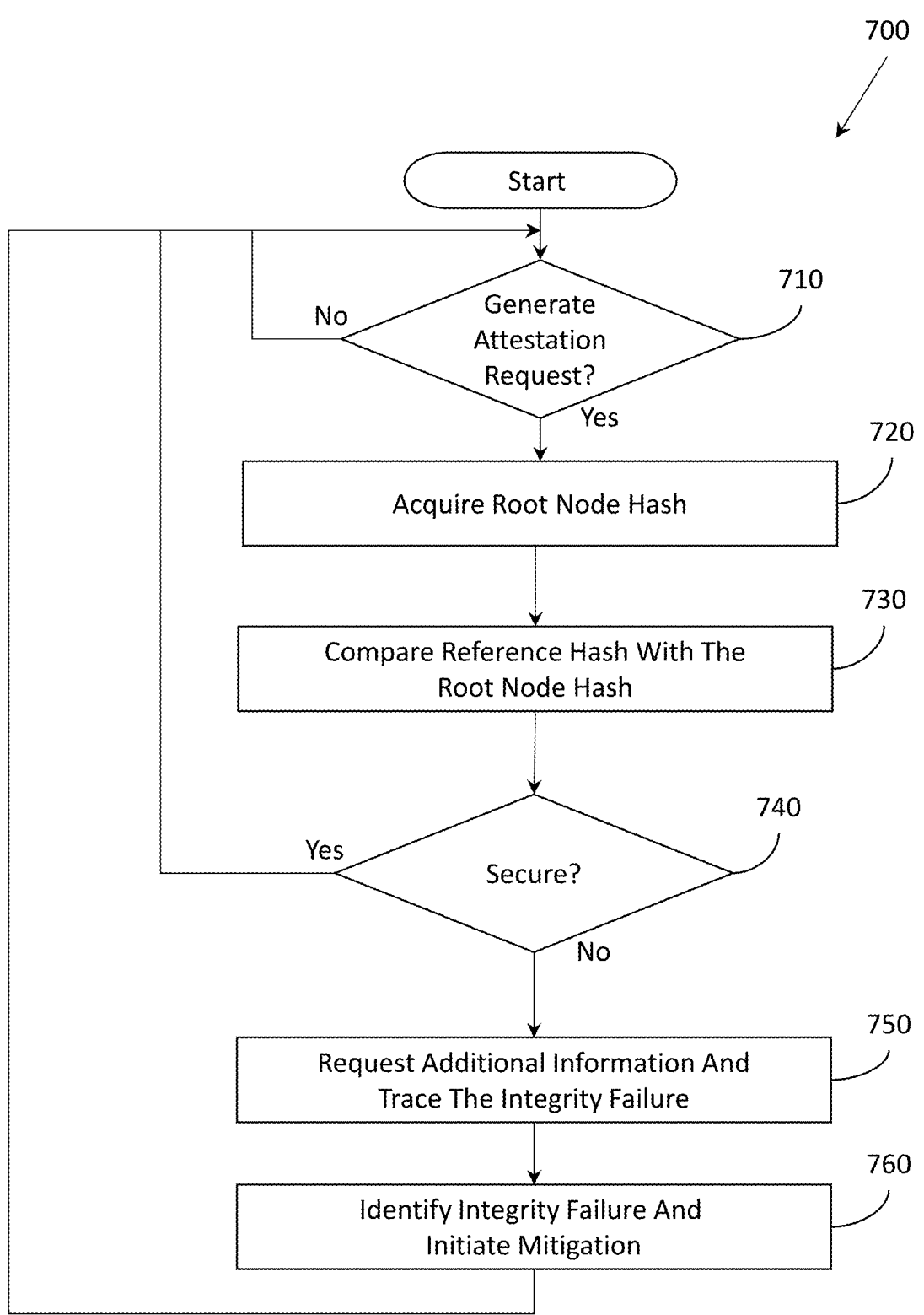
FIG. 7 is a flowchart showing a method for performing remote attestation by a remote device.
Figure 8:
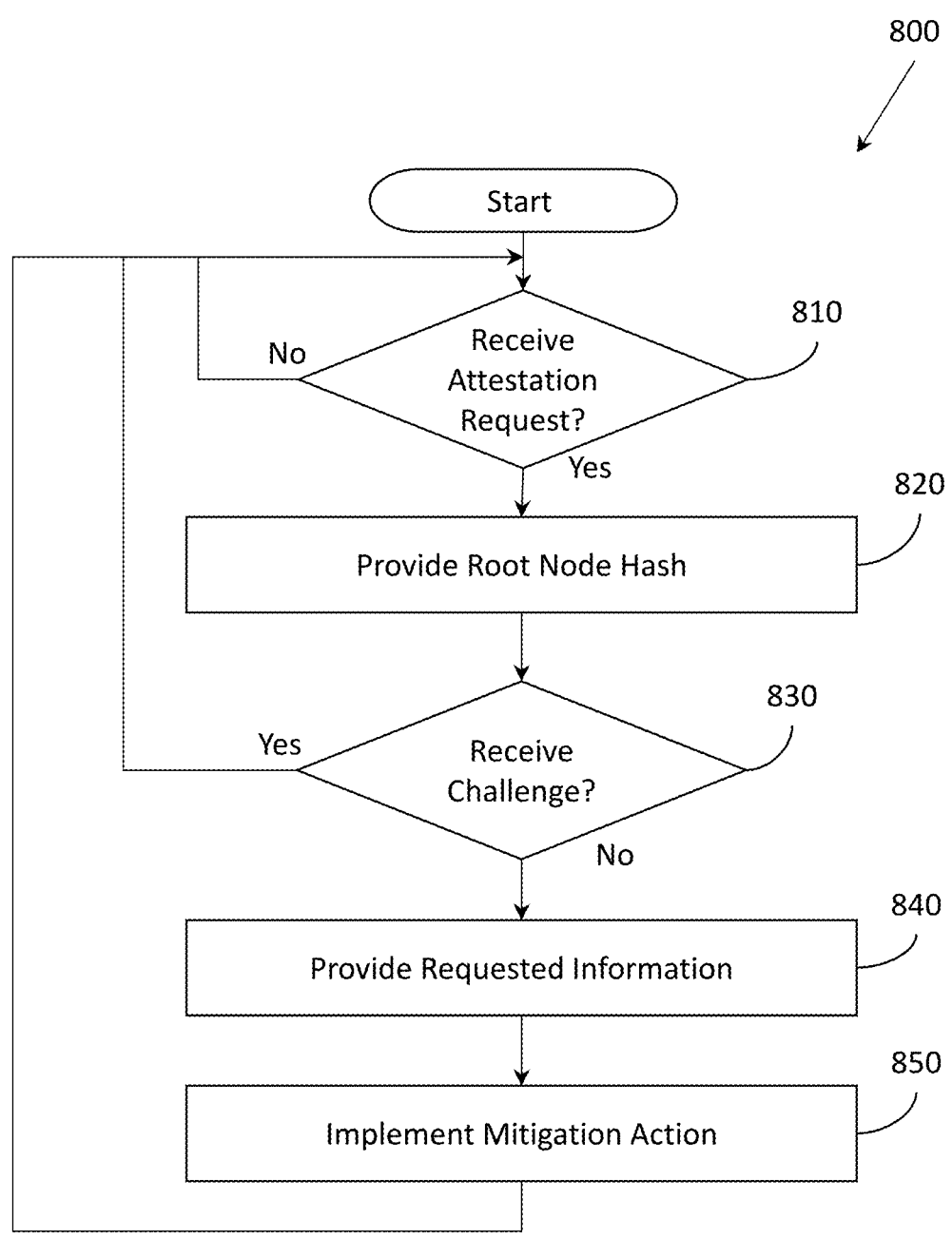
FIG. 8 is a flowchart showing a method for performing remote attestation in a vehicle.

Additional aspects of using incremental hashes to secure a system will be discussed in relation to FIG. 7. FIG. 7 illustrates a method 700 associated with using incremental hashes to perform attestation. Method 700 will be discussed from the perspective of the security system 170 of FIG. 2. While method 700 is discussed in combination with the security system 170, it should be appreciated that the method 700 is not limited to being implemented within the security system 170 but is instead one example of a system that may implement the method 700. Moreover, it should be noted that as described in FIG. 7, the method 700 is executing in a remote device that is generating the attestation request for validating the vehicle 100 and is the remote device is, thus, a relying party. Moreover, FIG. 8 illustrates a method 800 that is associated with fulfilling an attestation request. Method 800 will be discussed in combination with method 700. It should be appreciated that the method 800 is generally performed by the security system 170 within the vehicle 100 as depicted in FIGS. 1-2. As noted previously, while discussed in relation to FIGS. 1-2, method 800 may be implemented by other systems.

At 710, the remote device generates an attestation request. In one arrangement, the device generates the attestation request as a regular monitoring function to check the vehicle 100 for continued integrity. In a further example, the device generates the attestation request when connecting with the vehicle 100 to provide a service and/or to receive information from the vehicle 100. In general, the attestation request and subsequent verification function as a way for the device to verify the integrity of the vehicle 100 during runtime. The form of the attestation request itself may vary depending on the implementation but generally includes a generic request for the root hash of the vehicle 100 and may further include verification information about the requesting party, such as a signed digital certificate or other cryptographic element to verify the identity of the source.

At 810, the control module 220 monitors for an attestation request. Upon receiving the request, the control module 220 may initially verify the request according to a digital signature included within the request. The control module 220 may then proceed with fulfilling the request as described at 820.

At 820, the control module 220 provides the root hash, which is the incremental hash from the tree 240 to the requesting party. In one arrangement, the control module 220 communicates the root hash alone, while in further arrangements, the control module 220 may provide the root node hash with an attestation report. The attestation report may include a recent change to one or more metrics so that the requesting party can correctly verify the root node hash.

At 720, the remote device receives the root node hash. In the case where the root node hash is received with a further report identifying recent changes, the device may recompute a reference version of the root node hash that is stored locally. This provides the device with a point of comparison for determining whether the provided hash is correct or not.

At 730, the remote device compares the reference hash with the root node hash received from the vehicle 100. The comparison can take different forms depending on the implementation but is generally a direct comparison of values to determine whether the two are equivalent or not.

At 740, the remote device then determines whether the comparison indicates the vehicle 100 is secure or not. If the vehicle 100 is secure, then the reference hash and the provided root node hash will match. If they do not match, then the vehicle 100 has an integrity failure and is not secure. When the vehicle 100 is found to be not secure, the control module 220 can proceed with the inquiry to identify the particular software component that has been compromised.

At 750, the remote device proceeds with requesting additional information from the vehicle 100 and tracing the integrity failure. For example, the remote device can generate a recursive request for the hash of each parent node to trace the integrity failure to a leaf node. In one approach, the device generates the request using a tree traversal algorithm (e.g., BFS, DFS, etc.) in order to selectively traverse the tree and identify the cause. Of course, in further approaches, the device may simply request the whole tree 240 from vehicle 100; however, such an approach may require significant bandwidth and computational resources, which may be undesirable. Accordingly, the remote device, which is the relying party in the attestation request, may traverse the subtree corresponding to a software component associated with a high-risk domain (e.g., safety risk) before traversing other subtrees.

At 830, the control module 220 monitors for a challenge that is based on providing the root node hash. That is, as outlined in relation to method 700, if the remote device determines that the root node hash is not valid, then the vehicle 100 will receive a challenge message/request from the remote device. The request is for additional data so that the remote device can further trace the integrity failure. Accordingly, when the security system 170 does not receive a request (e.g., after a defined period of time), then the security system 170 determines that the attestation was successful and proceeds back to monitoring for a subsequent request. Otherwise, the security system 170 proceeds to providing the requested information.

At 840, the control module 220 provides the requested information. In general, the request of the remote device to trace the attestation failure is for the control module 220 of the vehicle 100 to provide one or more hashes of the parent nodes. That is, the request indicates the specific information to provide as determined on the part of the remote device and the control module 220 retrieves the information and communicates the information back to the remote device to facilitate the remote device tracing an integrity failure in one of the software components. It should be appreciated that this request/response process may occur over multiple iterations until the remote device identifies the cause of the failure.

At 760, the remote device identifies the integrity failure from tracing the hashes in the tree 240. In general, the remote device compares the hashes against reference values stored locally to determine the source (e.g., the particular metric and associated software component) of the integrity failure. As part of identifying a source of the failure, the remote device may log the failure by storing information about the software component and also additional information about the vehicle 100, such as a geographic location, a make/model/year, application logs, and so on.

Thereafter, the remote device can mitigate the integrity failure from the attack according to a mitigation deployment. The remote device may communicate the mitigation deployment to the vehicle 100 in order to correct the failure or at least prevent further damage. For example, the mitigation deployment is a control communicated to the vehicle 100 that causes the vehicle 100 to perform one or more actions. The actions can include restoring the software component(s) to a prior state using a system image, instantiating a failsafe mode within the vehicle 100, or performing another action to remediate the failure. While the mitigation deployment is described as being a control, the deployment may further include one or more files (e.g., images) for the vehicle 100 to use when performing the mitigation.

At 850, the control module 220 within the vehicle 100 mitigates the integrity failure from an attack according to the mitigation deployment. That is, the vehicle 100 executes one or more actions using existing functionality or through an executable provided from the remote device in order to correct the integrity failure. In this way, the security system 170 is able to use the homomorphic hash to secure the vehicle 100 and trace failures when they occur, thereby improving the operation of the associated computing systems and robustness against attack.

Figure 9:
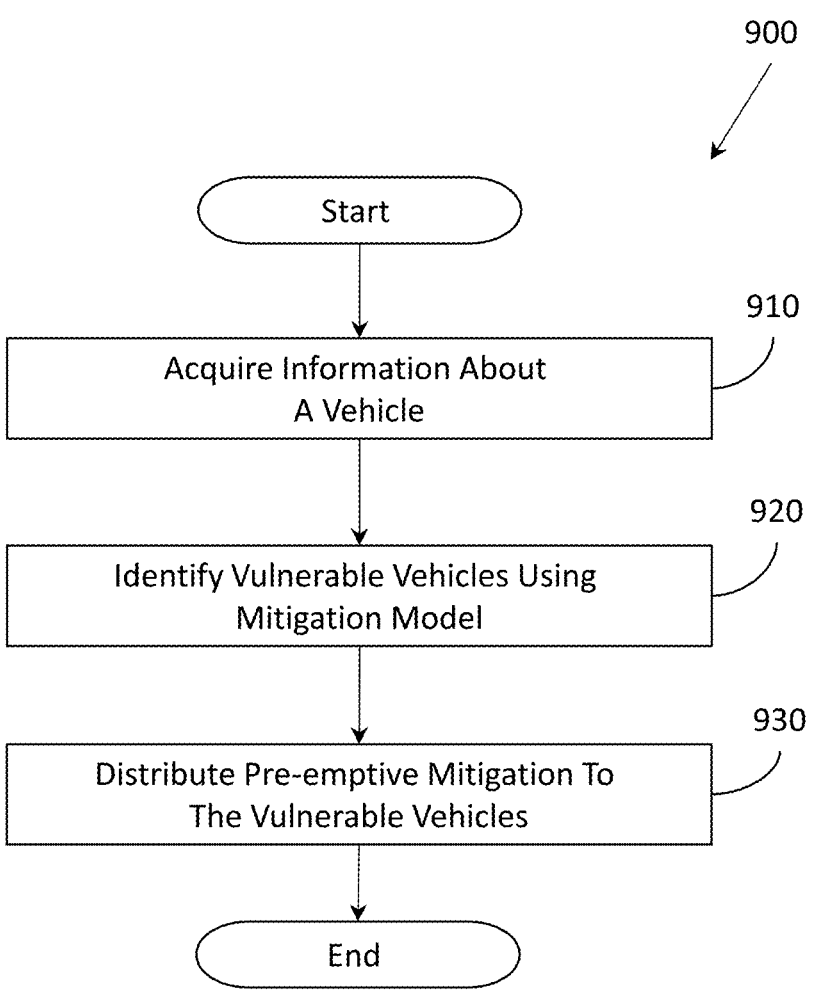
FIG. 9 is a flowchart showing a method for performing predictive remediation of integrity failures.

Additional aspects of using incremental hashes within vehicles to secure computing systems will be discussed in relation to FIG. 9. FIG. 9 illustrates a method 900 associated with using a machine-learning model to predict other vehicles that may be impacted by an attack. Method 900 will be discussed from the perspective of the security system 170 of FIG. 2. While method 900 is discussed in combination with the security system 170, it should be appreciated that the method 900 is not limited to being implemented within the security system 170 but is instead one example of a system that may implement the method 900.

At 910, the security system 170 acquires information about a vehicle that experienced an integrity failure. That is, in at least one approach, the security system 170 receives information about the software component(s) that experienced the failure and associated aspects, such as the particular metrics and changes to the metrics, if available. The information further includes characteristics of the vehicle, including make/model/year, the geographic location, application logs, and other information that may be available via telematics data, including devices with which the vehicle has interacted.

At 920, the security system 170 applies a mitigation model to the acquired information to generate a prediction about whether the failure may effect other vehicles and which vehicles may be impacted by the attack associated with the integrity failure. Thus, the mitigation model is analyzing the characteristics of the vehicle and the attack to correlate the information with other vehicles that may be vulnerable so that pre-emptive action can be taken. The mitigation model itself is a machine learning algorithm, such as a deep neural network (DNN), that is trained using the logged data from previously identified integrity failures in vehicles. Thus, from this information, the mitigation model is able to learn patterns that correlate the attacks with vehicles.

At 930, the security system 170 distributes pre-emptive mitigations to vulnerable vehicles identified by the mitigation model. The mitigation model may identify specific makes/models/years of vehicles, vehicles in particular geographic locations, application logs, vehicles with the software component that experienced the failure, and/or other determining characteristics. The security system 170 may further implement a threshold with the determinations of the mitigation model. That is, the security system 170 may receive a threshold/confidence value from the mitigation model in addition to identifying the vulnerable vehicles. Thus, the system may then determine when to provide the pre-emptive mitigation according to whether the confidence value satisfies (e.g., equals or exceeds) the threshold.

In any case, the security system 170 provides the mitigation in a similar manner as described in relation to the single vehicle when the integrity failure is detected. For example, the security system 170 can provide a command that causes the vulnerable vehicles to reimage a memory and, therefore, restore the software to a prior state. In further examples, the security system 170 may provide a software patch that facilitates preventing a future attack. In any case, the security system 170 is able to distribute the mitigating package to vulnerable vehicles in order to proactively thwart malicious attacks.

Figure 10:
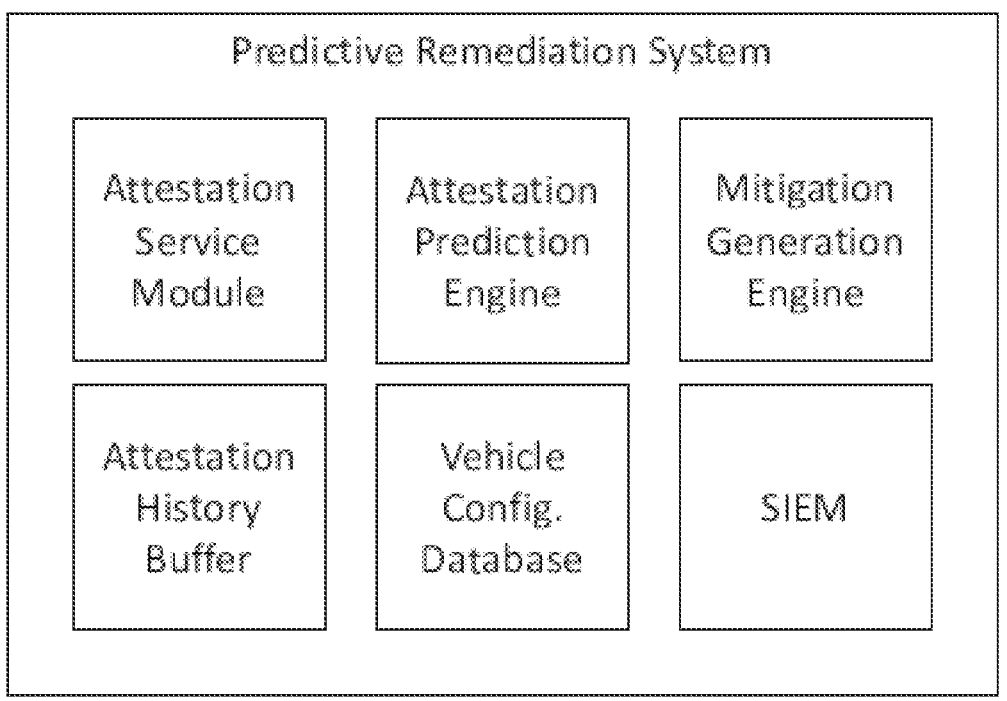
FIG. 10 illustrates one embodiment of a predictive remediation system.

With reference to FIG. 10, one example of a predictive remediation system that may execute method 900. The predictive remediation system is, for example, a separate implementation of the security system 170 with additional modules that are particular to the mitigation model. For example, the predictive remediation system includes an attestation service module, an attestation prediction engine, a mitigation generation engine, an attestation history buffer, a vehicle configuration database, and a security incident event monitoring (SIEM)module). The SIEM module functions to collect logs about integrity failures in vehicles, which may be aggregated together to form training data for the mitigation model. The mitigation model is, in the illustrated example, integrated with the attestation prediction engine. The attestation history buffer logs attestation reports (e.g., measurements) from vehicles to provide a historical record of operating conditions of the software components. The vehicle configuration database includes configurations of vehicles and which vehicles a fleet manager is managing in order to facilitate monitoring, including information on relationships between different vehicles and software used therein. The mitigation generation engine provides the mitigation packages that are distributed to the vulnerable vehicles.

Additionally, it should be appreciated that the security system 170 from FIG. 1 can be configured in various arrangements with separate integrated circuits and/or electronic chips. In such embodiments, the control module 220 is embodied as a separate integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In further embodiments, portions of the functionality associated with the module 220 may be embodied as firmware executable by a processor and stored in a non-transitory memory. In still further embodiments, the module 220 is integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the security system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 230) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected" or "communicably connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps.

The one or more data stores 115 can include sensor data. In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment, such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the security system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the security system 170, and/or the assistance system 160 may control some or all of these vehicle systems 150 and, thus, may be partially or fully autonomous.

The processor(s) 110, the security system 170, and/or the assistance system 160 can be operatively connected to communicate with the various vehicle systems 150 and/or individual components thereof. For example, returning to FIG. 1, the processor(s) 110, the security system 170, and/or the assistance system 160 can be in communication to send and/or receive information from the various vehicle systems 150 to control the movement, speed, maneuvering, heading, direction, etc. of the vehicle 100. The processor(s) 110, the security system 170, and/or the assistance system 160 may control some or all of these vehicle systems 150.

The processor(s) 110, the security system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the security system

170, and/or the assistance system 160 can control the direction and/or speed of the vehicle 100. The processor(s) 110, the security system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the security system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more modules that form the assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160, either independently or in combination with the security system 170, can be configured to determine travel path(s), current autonomous driving maneuvers for the vehicle 100, future autonomous driving maneuvers, and/or modifications to current autonomous driving maneuvers based on data acquired by the sensor system 120, driving scene models, and/or data from any other suitable source such. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product, which comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed, perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A security system, comprising:
one or more processors;
a memory communicably coupled to the one or more processors and storing:
a control module including instructions that, when executed by the one or more processors, cause the one or more processors to:
identify software components and associated metrics of the software components executing within a computing system of a vehicle according to a policy;
construct a tree according to the software components and partitions within the software components;

store, in leaf nodes of the tree, measurements of the metrics, wherein parent nodes define a hierarchical relationship between software components and the partitions;
generate an incremental hash of the tree;
provide the incremental hash as a secure representation of the software components; and
update the tree and the incremental hash by recomputing hashes at parent nodes of the tree associated with changes in the metrics and adapting the incremental hash according to the changes.

2. The security system of claim 1, wherein the instructions further include instructions to measure the metrics at defined times according to the policy, wherein the policy defines the partitions within the software components, a criticality of the software components, and the defined times for refreshing the metrics.

3. The security system of claim 1, wherein the instructions further include instructions to, responsive to receiving an attestation request, provide a root hash that is the incremental hash from the tree; and
wherein the instructions further include instructions to communicate with a remote device to provide requested hashes of the parent nodes when the root hash fails to match a reference hash stored at the remote device, wherein the instructions to communicate the requested hashes of the parent nodes facilitate the remote device tracing an integrity failure in one of the software components.

4. The security system of claim 3, wherein the instructions further include instructions to mitigate the integrity failure from an attack according to a mitigation deployment received from the remote device, wherein the mitigation deployment is a control to the vehicle that causes the vehicle to perform one or more of restore the software components to a prior state using a system image and instantiate a failsafe mode within the vehicle.

5. The security system of claim 1, wherein the instructions to generate the incremental hash include instructions to iteratively combine hashes from the parent nodes until reaching a root node that includes a root hash by combining hashes from the parent nodes in the tree,
wherein the tree is a Merkle tree, and
wherein the incremental hash is a homomorphic hash.

6. The security system of claim 1, wherein the metrics are measurements of one or more of: static data and dynamic data within the vehicle as defined by the policy.

7. The security system of claim 1, wherein the instructions further include instructions to analyze characteristics of the vehicle according to a mitigation model when the vehicle is identified as being subject to an integrity failure to generate a prediction about whether additional vehicles and which vehicles may be impacted by an attack associated with the integrity failure.

8. The security system of claim 1, wherein the security system is embedded within a vehicle and performs attestation for a relying party using the incremental hash.

9. A non-transitory computer-readable medium storing instructions that, when executed by one or more processors, cause the one or more processors to:
identify software components and associated metrics of the software components executing within a computing system of a vehicle according to a policy;
construct a tree according to the software components and partitions within the software components;

store, in leaf nodes of the tree, measurements of the metrics, wherein parent nodes define a hierarchical relationship between software components and the partitions;

generate an incremental hash of the tree;

provide the incremental hash as a secure representation of the software components; and update the tree and the incremental hash by recomputing hashes at parent nodes of the tree associated with changes in the metrics and adapting the incremental hash according to the changes.

10. The non-transitory computer-readable medium of claim 9, wherein the instructions further include instructions to measure the metrics at defined times according to the policy, wherein the policy defines the partitions within the software components, a criticality of the software components, and the defined times for refreshing the metrics.

11. The non-transitory computer-readable medium of claim 9, wherein the instructions further include instructions to, responsive to receiving an attestation request, provide a root hash that is the incremental hash from the tree; and wherein the instructions further include instructions to communicate with a remote device to provide requested hashes of the parent nodes when the root hash fails to match a reference hash stored at the remote device, wherein the instructions to communicate the requested hashes of the parent nodes facilitate the remote device tracing an integrity failure in one of the software components.

12. The non-transitory computer-readable medium of claim 11, wherein the instructions further include instructions to mitigate the integrity failure from an attack according to a mitigation deployment received from the remote device, wherein the mitigation deployment is a control to the vehicle that causes the vehicle to perform one or more of restore the software components to a prior state using a system image and instantiate a failsafe mode within the vehicle.

13. The non-transitory computer-readable medium of claim 9, wherein the instructions to generate the incremental hash include instructions to iteratively combine hashes from the parent nodes until reaching a root node that includes a root hash by combining hashes from the parent nodes in the tree, wherein the tree is a Merkle tree, and wherein the incremental hash is a homomorphic hash.

14. A method, comprising:

identifying software components and associated metrics of the software components executing within a computing system of a vehicle according to a policy;

constructing a tree according to the software components and partitions within the software components;

storing, in leaf nodes of the tree, measurements of the metrics, wherein parent nodes define a hierarchical relationship between software components and the partitions;

generating an incremental hash of the tree;

providing the incremental hash as a secure representation of the software components; and updating the tree and the incremental hash by recomputing hashes at parent nodes of the tree associated with changes in the metrics and adapting the incremental hash according to the changes.

15. The method of claim 14, further comprising:

measuring the metrics at defined times according to the policy, wherein the policy defines the partitions within the software components, a criticality of the software components, and the defined times for refreshing the metrics.

16. The method of claim 14, further comprising:

responsive to receiving an attestation request, providing a root hash that is the incremental hash from the tree; and communicating with a remote device to provide requested hashes of the parent nodes when the root hash fails to match a reference hash stored at the remote device, wherein communicating the requested hashes of the parent nodes facilitates the remote device tracing an integrity failure in one of the software components.

17. The method of claim 16, further comprising:

mitigating the integrity failure from an attack according to a mitigation deployment received from the remote device, wherein the mitigation deployment is a control to the vehicle that causes the vehicle to perform one or more of restore the software components to a prior state using a system image and instantiate a failsafe mode within the vehicle.

18. The method of claim 14, wherein generating the incremental hash includes iteratively combining hashes from the parent nodes until reaching a root node that includes a root hash by combining hashes from the parent nodes in the tree, wherein the tree is a Merkle tree, and wherein the incremental hash is a homomorphic hash.

19. The method of claim 14, wherein the metrics are measurements of one or more of: static data and dynamic data within the vehicle as defined by the policy.

20. The method of claim 14, further comprising:

analyzing characteristics of the vehicle according to a mitigation model when the vehicle is identified as being subject to an integrity failure to generate a prediction about whether additional vehicles and which vehicles may be impacted by an attack associated with the integrity failure.

\* \* \* \* \*